(12) United States Patent
Citriniti et al.

(10) Patent No.: US 8,672,660 B2
(45) Date of Patent: Mar. 18, 2014

(54) DEVICES AND METHODS FOR REGULATING EXTRUDER CERAMIC BATCH MATERIAL

(71) Applicant: Corning Incorporated, Corning, NY (US)

(72) Inventors: Joseph Henry Citriniti, Corning, NY (US); Gregory Eisenstock, Rochester, NY (US); Robert John Locker, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/933,487

(22) Filed: Jul. 2, 2013

(65) Prior Publication Data

US 2013/0295210 A1    Nov. 7, 2013

Related U.S. Application Data

(63) Continuation of application No. 12/788,389, filed on May 27, 2010, now abandoned.

(60) Provisional application No. 61/181,825, filed on May 28, 2009.

(51) Int. Cl.
  *B29C 35/00*    (2006.01)
(52) U.S. Cl.
  USPC ........ 425/143; 425/197; 425/376.1; 425/461; 425/144; 264/176.1; 264/122.12
(58) Field of Classification Search
  USPC .................. 425/143–144, 192 R, 376.1, 461, 425/197–199, 378.1; 264/176.1, 264/177.12–177.14
  See application file for complete search history.

(56) References Cited

U.S. PATENT DOCUMENTS

| | | | | |
|---|---|---|---|---|
| 3,070,836 | A | * | 1/1963 | De Haven et al. ........... 264/40.7 |
| 3,733,059 | A | * | 5/1973 | Pettit ............................... 366/79 |
| 3,843,290 | A | | 10/1974 | Sender .......................... 425/208 |
| 3,866,669 | A | * | 2/1975 | Gardiner ....................... 165/254 |
| 3,950,118 | A | | 4/1976 | Adair ............................. 425/144 |
| 4,044,082 | A | | 8/1977 | Rosette ........................ 264/1.23 |
| 4,197,070 | A | * | 4/1980 | Koschmann ................. 425/135 |
| 4,541,792 | A | * | 9/1985 | Zakic ............................ 425/143 |
| 4,875,782 | A | | 10/1989 | Fox ............................... 374/148 |
| 4,931,229 | A | | 6/1990 | Krimmel et al. ............... 264/3.3 |

(Continued)

OTHER PUBLICATIONS

Bruker et al.; "Numerical Analysis of the Temperature Profile in the Melt Conveying Section of a Single Screw Extruder: Comparison with Experimental Data"; Polymer Engineering and Science, Mid-Apr. 1987, vol. 27, No. 7; pp. 504-509.

(Continued)

*Primary Examiner* — Joseph S Del Sole
*Assistant Examiner* — Nahida Sultana
(74) *Attorney, Agent, or Firm* — Charles A. Greene; Matthew J. Mason

(57) ABSTRACT

A plate suitable for positioning with an extruder apparatus is provided in which the plate includes at least one temperature sensor. The plate is upstream of the die located at or near the end of the extruder apparatus. The sensor(s) allow for the simultaneous measurement of batch material temperatures at multiple spatial locations across the face of the plate. The temperature sensors associated with the plate can be used to identify spatial and temporal temperature patterns within the batch flow.

19 Claims, 3 Drawing Sheets

(56) References Cited

U.S. PATENT DOCUMENTS

| | | | |
|---|---|---|---|
| 5,055,028 A | 10/1991 | Trakas | 425/549 |
| 5,064,586 A | 11/1991 | Higashijima | 264/40.6 |
| 5,939,004 A | 8/1999 | Harrison | 264/251 |
| 6,649,095 B2 | 11/2003 | Buja | 264/40.6 |
| 7,131,833 B2 | 11/2006 | Babin | 425/549 |
| 7,207,790 B2 | 4/2007 | Trakas | 425/190 |
| 7,249,940 B2 * | 7/2007 | Senda et al. | 425/143 |
| 7,357,893 B2 | 4/2008 | Hansen et al. | 264/525 |
| 7,438,551 B2 | 10/2008 | Gellert et al. | 425/549 |
| 7,866,972 B2 | 1/2011 | Kuo | 425/192 R |
| 2005/0046072 A1 | 3/2005 | Shalkey | 264/169 |
| 2008/0113190 A1 | 5/2008 | Keller et al. | 428/339 |
| 2009/0186116 A1 | 7/2009 | Saito et al. | 425/463 |
| 2010/0239701 A1 * | 9/2010 | Chen et al. | 425/143 |
| 2011/0204535 A1 * | 8/2011 | Inoue | 264/40.6 |
| 2011/0221088 A1 * | 9/2011 | Fuse | 264/40.6 |
| 2011/0298155 A1 * | 12/2011 | Smith et al. | 264/328.16 |

OTHER PUBLICATIONS

Bur et al.; "Temperature Gradients in the Channels of a Single-Screw Extruder"; Polymer Engineering and Science, Nov. 2004, vol. 44, No. 11; pp. 2148-2157.

Kelly et al.; "Melt temperature field measurements in extrusion using thermocouple meshes"; Plastics, Rubber and Composites, 2008, vol. 37, No. 2/3/4; pp. 151-157.

Maier; "IR Temperature Measurement in Extruders"; ANTEC, 1995; pp. 237-241.

* cited by examiner

DEVICES AND METHODS FOR REGULATING EXTRUDER CERAMIC BATCH MATERIAL

CROSS REFERENCE TO RELATED APPLICATION

This application is a continuation of U.S. application Ser. No. 12/788,389 filed on May 27, 2010 which claims priority to U.S. Provisional Application No. 61/181,825, filed on May 28, 2009, the contact of which is relied upon and incorporated herein by reference in its entirety and the benefit of priority under 35 U.S.C. §120 is hereby claimed.

FIELD

The present disclosure relates to regulating the temperature of ceramic or ceramic forming batch material within an extruder, and more particularly to extruder assemblies having one or more temperature sensors to provide real-time information on the temperature of batch materials being forced through the assembly.

BACKGROUND

Ceramic substrates have been used commercially for over thirty years as carriers of catalytic agents to help remove pollutants from exhaust created by internal combustion engines. The principal method of manufacturing these substrates is to force a pre-ceramic batch material through a die plate, typically by pushing the batch material through the die plate with a ram or screw.

SUMMARY

In one aspect an extrusion apparatus is disclosed herein comprising: a first homogenizer plate having a first upstream plate surface, a first downstream plate surface, and a first plurality of interior surfaces defining a first plurality of through holes extending from the first upstream plate surface to the first downstream plate surface; a second homogenizer plate having a second upstream plate surface, a second downstream plate surface, and a second plurality of interior surfaces defining a second plurality of through holes extending from the second upstream plate surface to the second downstream plate surface, wherein the second upstream plate surface is disposed adjacent to the first downstream plate surface; and one or more temperature sensors disposed between the first downstream plate surface and the second upstream plate surface; wherein the first plurality of through holes is substantially aligned with the second plurality of through holes, whereby an extrudate material is capable of flowing through the first plurality of through holes and then through the second plurality of through holes.

In some embodiments, the first downstream plate surface of the first homogenizer plate contacts the second upstream plate surface of the second homogenizer plate. In some embodiments, the first homogenizer plate is sealed to the second homogenizer plate. In some embodiments, at least one homogenizer plate includes one or more temperature sensors disposed in one or more recesses in the first downstream plate surface. In some embodiments, one or more temperature sensors are affixed to the first downstream plate surface.

In some embodiments, the homogenizer plate includes sensors that are not exposed to the first or second plurality of interior surfaces of the homogenizer plate. In some embodiments, the temperature sensors associated with the plate are connected to the one or more temperature sensor connectors which are in turn connected to one or more wires. In some embodiments, one or more wires connected to the temperature sensors are disposed in one or more recesses in the first downstream plate surface. In some embodiments, the one or more wires connected to the temperature sensors are not exposed to the first or second plurality of interior plate surfaces.

In some embodiments, a homogenizer plate that includes one or more temperature sensors includes a first upstream plate surface and the first plurality of interior surfaces include chamfered entrances to the first plurality of through holes. In some embodiments, an extruder apparatus that includes a plate having one or more sensors further includes a screen having a downstream screen surface facing the first upstream plate surface. In some embodiments, the screen is capable of touching the first upstream plate surface. In some embodiments, the extruder apparatus includes a housing in which the first and second homogenizer plates and the one or more temperature sensors are mounted. In some embodiments, the extrusion apparatus further comprises an extruder die having an upstream die surface facing the second downstream plate surface.

Another aspect of the present disclosure is a ceramic precursor extrudate control system, comprising: an extrusion apparatus disposed at an outlet of the extruder, the extrusion apparatus comprising: a first homogenizer plate having a first upstream plate surface, a first downstream plate surface, and a first plurality of interior surfaces defining a first plurality of through holes extending from the first upstream plate surface to the first downstream plate surface; a second homogenizer plate having a second upstream plate surface, a second downstream plate surface, and a second plurality of interior surfaces defining a second plurality of through holes extending from the second upstream plate surface to the second downstream plate surface, wherein the second upstream plate surface is disposed adjacent to the first downstream plate surface; and one or more temperature sensors disposed between the first downstream plate surface and the second upstream plate surface; wherein the first plurality of through holes is substantially aligned with the second plurality of through holes, whereby an extrudate material is capable of flowing through the first plurality of through holes and then through the second plurality of through holes; a barrel having a jacket and cooling device capable of providing a barrel coolant flow to the barrel jacket; a master controller capable of receiving a plurality of measured temperature outputs from the plurality of temperature sensors and configured to store at least one batch material temperature setpoint; and a slave controller capable of receiving a signal from the master controller and controlling the delivery of coolant to the extruder assembly in response thereto, and/or capable of receiving a signal from the master controller and controlling the delivery of coolant to one or more screws or one or more shafts disposed in the extruder in response to the signal from the master controller. In one embodiment, a first sensor is located near the center of the temperature control plate and a second sensor is located near the edge of the temperature control plate.

DESCRIPTION

For the purposes of promoting an understanding the principles of the novel technology, reference will now be made to the various exemplary embodiments thereof, and specific language will be used to describe the same. It will nevertheless be understood that no limitation of the scope of the novel technology is thereby intended, such alterations, modifications, and further applications of the principles of the novel technology being contemplated as would normally occur to one skilled in the art to which the novel technology relates.

An increase in temperature of a ceramic forming batch comprising an organic binder material such as methylcellulose initially reduces the mixture's viscosity, but once the material's temperature reaches its incipient gelation temperature (for example of about 46° C. for a 2.0% aqueous solution of methylcellulose), the viscosity of the material increases dramatically. Complicating the extrusion process for ceramic based filters is that in order to produce extrudates that retain their fine honeycombed structure up to and through firing of the material, it is necessary to extrude the material near its gelation temperate. This requires careful regulation of the batch material's temperature throughout the extrusion process, especially as it enters the die plate.

Figure 1:
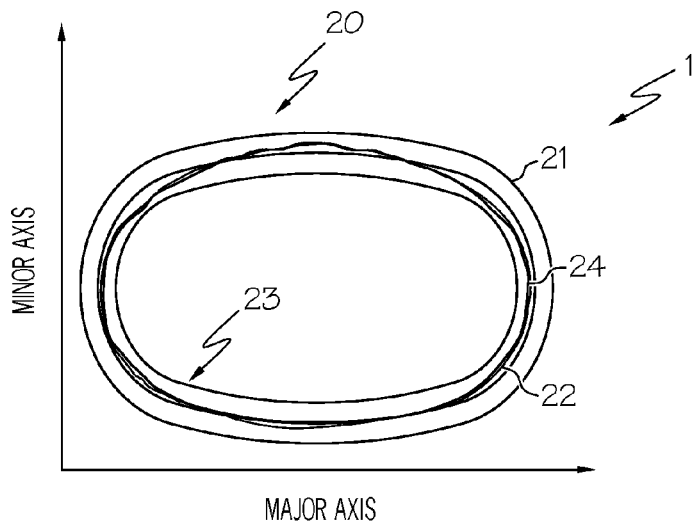
FIG. 1 depicts a 10× view of a contour plot showing the shape of an extrudate formed at a core temperature of 33° C. and a skin temperature of 31° C.
Figure 2:
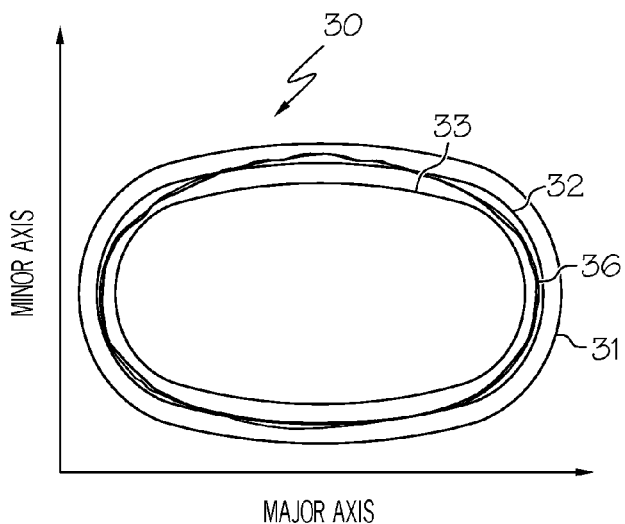
FIG. 2 depicts a 10× view of a contour plot showing the shape of an extrudate formed at a core temperature of 36° C. and a skin temperature of 33° C.

Extrudates formed at or near the optimal temperature for a given batch formulation will generally have fewer imperfections than those formed at sub-optimal temperatures. The structures formed using this process can be thick enough to exhibit a difference in temperature between the core of the extrudate and the skin (periphery) of the extrudate. And for most ceramic precursor batch materials that are extruded to form an extrudate, achieving proper core and skin temperatures is important. An imbalance in the ratio of an extrudate's core to skin temperatures can introduce imperfections in the extrudate. Referring now to FIGS. 1 and 2, contour plot composites (20 and 30, respectively) of extrudates formed from Aluminum Titanate are shown. The tracings in these figures were magnified ten times (10×) to better illustrate the variability in the extrudate shape formed at different temperatures.

Referring still to FIG. 1, the contour plots (20) show a noticeable drift of material (24) towards the minor axis and away from the ideal contours (21, 22 and 23) of an extrudate when the extrudate is formed by forcing the batch material through a die plate at a core temperature of 33° C. and a skin temperature of 31° C. This is indicative of an "A" flow front. Moreover, in FIG. 2, contour plot (30) was generated when the same Aluminum Titanate batch material was extruded through the same die at a batch material core temperature of 36° C. and a batch material skin temperature of 33° C. The contour (36) of the extrudate formed under these batch temperatures is more even (i.e., less material accumulates along the minor axis of the contour) and more closely approximates the ideal extrudate shapes (31, 32 and 33). These plots illustrate that extrudate core and skin temperatures have a significant impact on the shape of the extrudate.

Still another imperfection introduced into extrudates by forming them under substantially unfavorable core and skin temperatures is the formation of extrudates with "C" fronts, i.e., a disproportional accumulation of material along the major axis of the contour plot (example not shown). Controlling the core and skin temperatures of a given ceramic precursor batch formulation below its gel point can have a significant effect on the shape of the extrudate. Extrudates with either "A" or "C" front imperfection can be avoided by properly controlling the extrudate's core and skin temperatures.

According to methods disclosed herein, in order to ensure the production of saleable ware, heat transfer from the extruder barrel to the batch material (or from the batch material to the barrel) is regulated at a rate sufficient to maintain a desirable difference between the material's core skin temperatures, which can include cooling the batch material's temperature by transferring heat from the material to at least one barrel of the extruder. A temperature range can be selected such that it produces an extrudate with a uniform shape, resulting in a larger number of error free products and a reduced need for product reworking. For example, with one type of batch material, the difference between the core temperature and the skin temperature of the extrudate is not less than about 1° C. and not more than about 3° C.

The temperature of the batch material can be monitored by an extruder assembly outfitted with a series of temperature sensors. In order to effectively control the temperature of the extrudate material as it is forced through the die plate, it can be helpful to measure the temperature of the batch material at a point in the process in which the batch temperature approximates the temperature of the material as it passes through the die. In some embodiments the temperature of the material is measured at a position far enough upstream of the die plate to allow sufficient contact time between the material and the extruder assembly to be able to change the temperature of the material before it is forced through the die plate.

Inserting even a single straight line temperature probe into the extruder assembly (where it can directly contact the batch material as opposed to the extrusion apparatus disclosed herein) and thereby into the path of the batch material near the die plate can introduce a disruption in the flow of the material which can itself introduce defects in the extrudate. This problem is further aggravated by inserting additional straight line probes into the flow path of the batch material when it is desired to simultaneously measure the batch material's core and skin temperatures.

Figure 3:
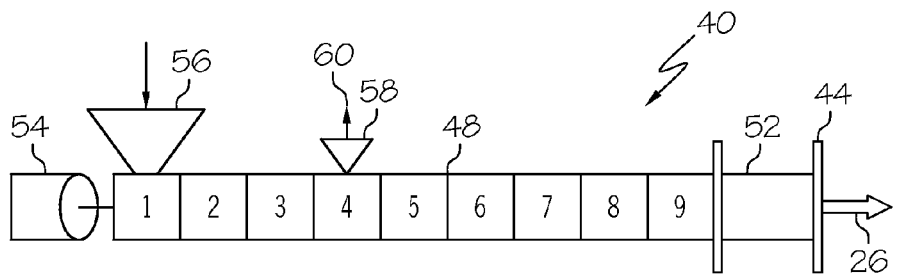
FIG. 3 depicts a schematic representation of an extruder apparatus including a material input funnel, a vacuum vent, a multiplicity of cooling barrels, a front end, and a die.

Various embodiments of the present disclosure provide devices and methods of controlling the temperature of batch materials in extruder assemblies and passing through die plates. For instance, and referring to FIG. 3, one exemplary extruder apparatus (40) comprises at least one barrel section (58) or a series of barrels (e.g., 1, 2, 3, 4, 5, 6, 7, 8, 9) of an extruder assembly (40) and through an extruder die (44) disposed at the outlet of the extruder (52). The direction of the flow of the batch material in FIG. 3 is shown by the arrow (26). The temperature of at least one barrel of the extruder is regulated by barrel coolant flow. The extruder includes a motor (54) to drive an extruder screw (not shown), a funnel (56) to feed material into the extruder assembly, and a vacuum vent (58) to remove gas (60) from the batch. Embodiments of the present disclosure can be used to measure the temperature of the batch material while the material is in the extruder apparatus and can provide methods of using the temperature sensing device in combination with other elements of an extruder apparatus to regulate the temperature of a pre-ceramic batch material positioned within the extruder apparatus.

In some embodiments the transfer of heat into the batch material is regulated to maintain a core temperature of the extrudate within a target first temperature range. In one such embodiment, the core temperature of the extrudate is not less than 31° C. and not more than 37° C. In some embodiments, the heat transfer to the batch material is regulated so as to maintain a skin temperature of the extrudate to be within a second target temperature range. In one such embodiment, the skin temperature is not less than 27° C. and not more than 34° C.

In some embodiments disclosed herein the amount of heat transferred to a batch material is regulated such that the flow rate of the extrudate exiting a center portion of the die is greater than a flow rate of the extrudate exiting the outer portion of the die. In some embodiments, this results in the formation of a substantially uniform extrudate face, less waste and a better quality extrudate. A die mask could optionally be left off from the face of the die plate where it would otherwise be placed to compensate for imperfections in the die plate that lead to unacceptable defects in the extrudate.

In other embodiments, the heat transfer to the batch material from the extruder barrel assembly is regulated so as to cause the flow rate of the extrudate exiting a center portion of the die to be less than the flow rate of the extrudate exiting an outer portion of the die.

A method of controlling the shape of a ceramic precursor extrudate is contemplated herein, comprising the steps of forming an extrudate by extruding ceramic precursor batch material through a barrel of an extruder and through an extruder die disposed at the outlet of the extruder wherein the barrel temperature setpoint is an output of a master controller, and the batch material temperature and the batch material temperature setpoint are provided as inputs to the master controller. In one embodiment, the setpoint is an output of a slave controller, and the barrel temperature setpoint and the measured barrel temperature provide inputs to the slave controller. In one embodiment, the batch material temperature setpoint is an output of a supervisory controller. According to this embodiment, the supervisory controller receives process inputs.

In some embodiments, the process inputs comprise parameters such as the composition of the batch material, feed rate of the batch material, extrudate geometry, die characteristics and the like, or combinations thereof. In one embodiment, the supervisory controller provides the batch material temperature setpoint, master controller parameters, slave controller parameters, barrel weighting factors and the like, or combinations thereof.

An extruder can be provided with a plurality of barrel coolant flows, and the batch material temperature can be determined by measuring the temperature of a structure proximate to the die and within the extruder. The batch material temperature setpoint may be determined from measurements of a core temperature and a skin temperature of the extrudate.

In another aspect a ceramic precursor extrudate control system is disclosed herein comprising: an extruder comprising a barrel; an extruder die disposed at the outlet of the extruder; a barrel cooling device capable of providing a barrel coolant flow to the barrel; a batch material temperature sensor disposed within the extruder upstream of the die and capable of delivering a batch material temperature; a barrel temperature sensor capable of delivering a barrel temperature; a master controller capable of receiving the batch material temperature and the batch material temperature setpoint as inputs, and capable of delivering a barrel temperature setpoint; and a slave controller capable of receiving the barrel temperature setpoint and the measured barrel temperature as inputs, and capable of delivering a coolant flow setpoint. In one embodiment, the control system further includes a supervisory controller capable of delivering the batch material temperature setpoint to the master controller.

In another aspect a method is disclosed herein for controlling the temperature of batch material in an extruder apparatus including the steps of measuring the temperature of batch material within the extruder. In one embodiment, the batch materials are measured upstream of the die as is the temperature of at least one portion of the barrel. In one aspect of this illustrative embodiment, the barrel temperature is measured at a barrel that is supplied with a cooling source, such that the temperature of the barrel can be changed in response to the temperature of the batch material. The batch material temperature can be determined and compared to a setpoint for the batch material temperature stored within the device. This information can be used to regulate the flow of coolant to at least one barrel in the extruder body such that the temperature of the batch material is or at least starts to converge on the batch setpoint temperature.

Figure 4A:
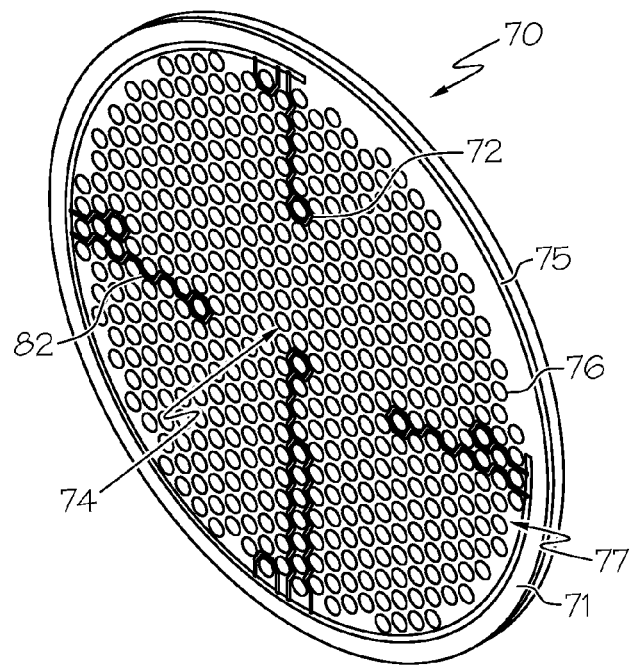
FIG. 4A depicts a prospective view of a component of a homogenizer plate that includes more than one temperature sensor.
Figure 4B:
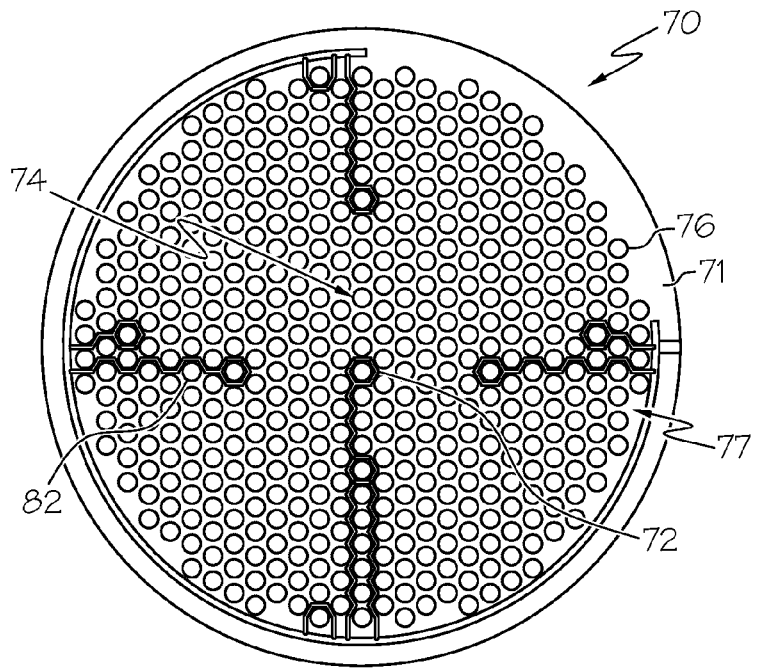
FIG. 4B depicts a planar view of a component of a homogenizer plate that includes more than one temperature sensor.

Referring now to FIGS. 4A and 4B, extrusion apparatus (70) is comprised of one or more plates (alternatively referred to as temperature sensing plate). The apparatus (70) has at least one component comprising a plate body (71), the body including a plurality of openings (76) therethrough and an edge (75), a center (74) and a periphery (77). The apparatus (70) further includes at least one temperature sensor (72) or a plurality of sensors. The sensors (72) may each be attached to at least one optional connector (not shown), and the connectors in turn attached to a wire (82). The sensors (72) and wires (82) are affiliated with the plate body (71) such that the sensors (72) and wires (82) do not obstruct the flow of batch material through the opening (76) therethrough in the plate (71). The plate (71) has a groove, or a series of grooves that accommodate the temperature sensors (72), connectors, and wires (82).

Figure 5:
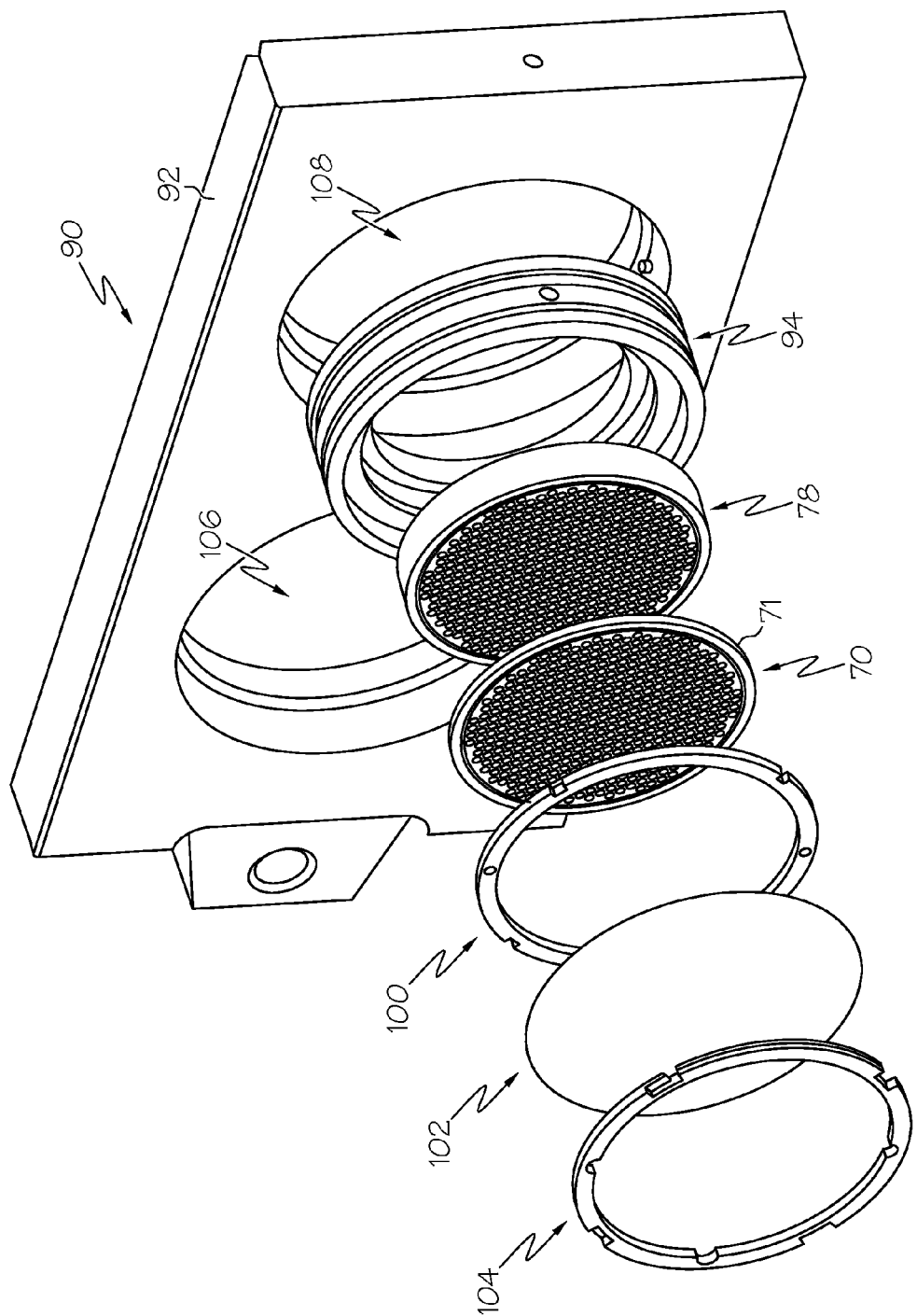
FIG. 5 depicts an exploded view of a screen changer slide plate and components used to control the flow of batch in an extruder.

Referring to FIG. 5, the extrusion apparatus (70) may include a second plate member (78) that is substantially or identically aligned with the openings (76) therethrough in the plate (71). In some embodiments, for instance, a stack of two or more plates can be provided. Batch material flowing through the stack would not appreciably contact, and preferably would not contact, either the temperature sensors (72) or the connectors (82) in the stack. In some embodiments, the openings (76) therethrough in the plate are chamfered on the side of the plate (71) that contacts the leading edge of the batch material moving through the extruder apparatus. In one embodiment, at least one temperature sensor (72) is positioned near the center (74) of the plate (71) and at least one other temperature sensor (72) is positioned in the periphery (77) of the plate.

Extrusion apparatus (70) can further include housing (94) in which plates (71) and (78) rest and which can be held in place by retainer ring (100). Screen (102) can be mounted upstream of retainer ring (100) and plate (71) such that screen (102) can contact plate (71) during extrusion of batch material therethrough. Screen (102) can be held in place by locking ring (104). The housing (94) can be mounted within slide plate (90), which is generally used to enable the extruder operator to change or adjust screen (102) during an extrusion run without having to completely suspend the extrusion process. Batch material flow is transiently shunted from the side of the slider plate that is being adjusted to the side set-up for extrusion. The extrusion apparatus (70) shown in FIG. 5 can also be used with an extruder assembly that does not have a slider plate.

Referring again to FIG. 5, a slide plate (90) can include a rigid block (92) having at least two openings therethrough (106 and 108). The block (92) is attached to the extruder assembly such that the batch material can be made to flow in the alternative through either opening (106) or (108). The housing (94) may accommodate homogenizer plate (78), temperature sensor plate (71) or stack thereof. In some embodiments the temperature sensor plate (71) is adjacent to a homogenizer plate (78) that does not include any temperature sensors. A housing (94) can be fitted into one of the openings (i.e., (106) or (108)) of the slide plate (90).

EXAMPLES

The temperature sensor plate (71) can be manufactured by creating a ¼ inch thick plate made of metal such as anodized aluminium or hardened stainless steel. The plate (71) can have the same outer dimension as the second homogenizer plate (78) to which it will be mated and/or it may have an outside diameter such that it or its housing can be fitted into a slide plate (90). The plate (71) can have multiple holes drilled into the front face to match the pattern of holes in the optional second homogenizer plate (78). The holes can be chamfered on the leading edge of the plate to reduce frictional effects of the batch material as it enters the holes. The back of the plate can be left flat for example to improve surface area contact with the backing homogenizer plate (78).

Once the through hole openings (76) have been drilled into a pattern (for example, 0.037" wide by 0.044" deep), wireways can be milled into the back of the plate (for example with 0.047" wide by 0.217" long by 0.138" deep pockets) for the wires and temperature sensors. The milled wire-way holds the wires which allow communication to the temperature sensors. An additional circumferential groove can run 270° around the plate and carries the electrical wires (82) to an outside deflector (not shown). The dimensions of the groove may be on the order of, for example, 0.063" wide by 0.044" deep. Once the wires (82) have been routed and the sensors positioned in their pockets, the entire wire-way groove is filled with a thermally conductive, electrically insulating epoxy to hold everything in place. Once hardened, the surface of the epoxy is trimmed and smoothed so as to be flush with the back surface of the temperature plate. The temperature plate is then assembled in the screen cartridge and fitted into a slide plate (90) as shown in FIG. 5. The wires (82) providing communication to the temperature sensors (72) are attached to a female wire connector which connects to the male connector inserted (not shown) into the hole drilled (not shown) into the slide plate (90). Alternatively, an inductively coupled connector can be used to send/receive temperature signals and flexible circuit power across a small gap between the slide plate and another component of the extrusion apparatus (70) such as the housing (94). The inductively coupled connector can add to manufacturing robustness because there are no physical male/female pins to wear or become damaged.

In some embodiments, a digital circuit card reads the temperatures and sends the data to a computer for storage into the plant data archive. The temperature sensors are put into operation once the slide plate (90 in FIG. 5) is installed into the extruder and the system is filled with batch material. Data from temperature sensors (72) positioned near the center (74) and periphery (77) can be collected at essentially the same time. These temperature measurements are compared to determine if the batch materials core and peripheral (or skin) temperature need to be adjusted.

An extrusion die, which is positioned at one end of an extruder assembly, can be cut to form a honeycomb structure at the exit of the extruder. The uniformity, strength and performance of the resulting substrates are strongly dependent on the rheological properties of the batch material as it passes through the die. These rheological properties in turn are dependent on how the batch material is treated as it passes through the portion of the extruder assembly upstream from the die plate. The rheology of the batch material is dependent on many fundamental properties including, among others, the materials comprising the batch, the moisture content of the batch, the pressure in the extruder assembly and degree of mixing, and the temperature history of the batch as it progresses through the extruder assembly. The rheology of the batch material is particularly impacted by this last property since most extrusion processes achieve peak efficiencies by running the batch material through the extruder assembly at very near its gelation temperature.

While the novel technology has been illustrated and described in detail in the figures and foregoing description, the same is to be considered as illustrative and not restrictive in character, it being understood that only the preferred embodiments have been shown and described and that all changes and modifications that come within the spirit of the novel technology are desired to be protected. As well, while the novel technology was illustrated using specific examples, theoretical arguments, accounts, and illustrations, these illustrations and the accompanying discussion should by no means be interpreted as limiting the technology. All patents, patent applications, and references to texts, scientific treatises, publications, and the like referenced in this application are incorporated herein by reference in their entirety.

We claim:

1. A ceramic precursor extrudate control system, comprising:
    an extrusion apparatus disposed at an outlet of an extruder comprising a barrel having a jacket and cooling device capable of providing a barrel coolant flow to the barrel jacket, the extrusion apparatus comprising:
        a first homogenizer plate having a first upstream plate surface, a first downstream plate surface, and a first plurality of interior surfaces defining a first plurality of through holes extending from the first upstream plate surface to the first downstream plate surface;
        a second homogenizer plate having a second upstream plate surface, a second downstream plate surface, and a second plurality of interior surfaces defining a second plurality of through holes extending from the second upstream plate surface to the second downstream plate surface, wherein the second upstream plate surface is disposed adjacent to the first downstream plate surface; and
        one or more temperature sensors disposed between the first downstream plate surface and the second upstream plate surface; wherein the first plurality of through holes is substantially aligned with the second plurality of through holes, whereby an extrudate material is capable of flowing through the first plurality of through holes and then through the second plurality of through holes;
    a master controller capable of receiving a plurality of measured temperature outputs from the one or more temperature sensors and configured to store at least one batch material temperature setpoint; and a slave controller capable of receiving a signal from the master controller and controlling the delivery of coolant to the barrel jacket, to one or more screws disposed in the extruder, or to one or more shafts disposed in the extruder, or a combination thereof, in response to the signal from the master controller.

2. The ceramic precursor extrudate control system according to claim 1, wherein a first sensor is located near the center of the first homogenizer plate and a second sensor is located near the edge of the first homogenizer plate.

3. The ceramic precursor extrudate control system according to claim 1, wherein the sensors do not obstruct the substantially aligned first and second plurality of through holes, whereby the sensors do not obstruct extrudate material flowing through the first and second plurality of through holes.

4. The ceramic precursor extrudate control system according to claim 1, further comprising one or more wires connected to the one or more temperature sensors.

5. The ceramic precursor extrudate control system according to claim 4, wherein the one or more wires are disposed in one or more recesses in the first downstream plate surface.

6. The ceramic precursor extrudate control system according to claim 5, wherein the one or more recesses are filled with a thermally conductive, electrically insulating epoxy.

7. The ceramic precursor extrudate control system according to claim 6, wherein the epoxy configured so as to have a surface that is flush with the first downstream plate surface.

8. The ceramic precursor extrudate control system according to claim 1, wherein the first homogenizer plate is sealed to the second homogenizer plate.

9. The ceramic precursor extrudate control system according to claim 1, wherein the one or more temperature sensors are not exposed to the first or second plurality of interior surfaces.

10. The ceramic precursor extrudate control system according to claim 4, wherein the one or more wires are not exposed to the first or second plurality of interior surfaces.

11. The ceramic precursor extrudate control system according to claim 1, wherein the first upstream plate surface and the first plurality of interior surfaces define chamfered entrances to the first plurality of through holes.

12. The ceramic precursor extrudate control system according to claim 1, further comprising a screen having a downstream screen surface facing the first upstream plate surface.

13. The ceramic precursor extrudate control system according to claim 1, further comprising an extruder die having an upstream die surface facing the second downstream plate surface.

14. The ceramic precursor extrudate control system according to claim 1, further including a die plate, wherein the die plate is positioned at one end of the extrusion apparatus downstream of the second homogenizer plate.

15. The ceramic precursor extrudate control system according to claim 4, wherein the one or more wires are attached to a female wire connector that connects to a male connector.

16. The ceramic precursor extrudate control system according to claim 1, further comprising an inductively coupled connector that is capable of sending and receiving signals between the one or more temperature sensors and at least one other component of the extrusion apparatus.

17. The ceramic precursor extrudate control system according to claim 16, wherein the inductively coupled connecter is capable of sending and receiving flexible circuit power between the one or more temperature sensors and another component of the extrusion apparatus.

18. The ceramic precursor extrudate control system according to claim 1, wherein a digital circuit card receives measured temperature output data from the one or more temperature sensors and sends the data to a computer.

19. The ceramic precursor extrudate control system according to claim 18, wherein the measured temperature output data is correlated to rheological properties of extrudate material and used by the slave controller to control the delivery of coolant to the barrel jacket, to one or more screws disposed in the extruder, or to one or more shafts disposed in the extruder, or a combination thereof.

* * * * *